(12) United States Patent
    Cannon

(10) Patent No.: US 10,562,446 B2
(45) Date of Patent: Feb. 18, 2020

(54) INTERIOR TRIM ELEMENT FOR A MOTOR VEHICLE

(71) Applicant: International Automotive Components Group GmbH, Dusseldorf (DE)

(72) Inventor: Carter Scott Cannon, Munich (DE)

(73) Assignee: INTERNATIONAL AUTOMOTIVE COMPONENTS GROUP GMBH, Dusseldorf (DE)

( * ) Notice: Subject to any disclaimer, the term of this patent is extended or adjusted under 35 U.S.C. 154(b) by 0 days.

(21) Appl. No.: 15/077,607

(22) Filed: Mar. 22, 2016

(65) Prior Publication Data

US 2016/0280128 A1    Sep. 29, 2016

(30) Foreign Application Priority Data

Mar. 23, 2015 (DE) .................. 10 2015 104 299

(51) Int. Cl.
    *B60Q 3/54*    (2017.01)
    *B60R 13/02*   (2006.01)

(52) U.S. Cl.
    CPC ............ *B60Q 3/54* (2017.02); *B60R 13/0262* (2013.01)

(58) Field of Classification Search
    CPC ...................................... B60Q 3/54; B60Q 3/14
    See application file for complete search history.

(56) References Cited

U.S. PATENT DOCUMENTS

| 4,010,057 A | 3/1977 | Nakanishi |
| 4,349,592 A | 9/1982 | Nussbaum |
| 4,396,680 A | 8/1983 | Chang |
| 4,576,855 A | 3/1986 | Okina |
| 4,681,811 A | 7/1987 | Simpson et al. |
| 4,883,940 A | 11/1989 | Tokarz |
| 4,917,927 A | 4/1990 | Sakaitani et al. |
| 4,991,064 A | 2/1991 | Clem |

(Continued)

FOREIGN PATENT DOCUMENTS

| DE | 4124297 A1 | 1/1993 |
| DE | 102 40 270 A1 | 3/2004 |

(Continued)

OTHER PUBLICATIONS

European Search Report dated Oct. 19, 2010 in European Patent Application No. 10158203.9-1253.

(Continued)

*Primary Examiner* — Jong-Suk (James) Lee
*Assistant Examiner* — Christopher E Dunay
(74) *Attorney, Agent, or Firm* — Grossman, Tucker, Perreault & Pfleger, PLLC

(57) ABSTRACT

The invention relates to an interior trim element for a motor vehicle which comprises: a translucent carrier component with a front side and a rear side, a translucent cover material on the front side of the carrier component and a light source on the rear side of the carrier component, wherein the translucent cover material has a Shore A hardness in the range between 60 and 80, wherein the interior trim element comprises at least one surface of a storage tray or storage compartment of the motor vehicle which is visible to passengers of the motor vehicle, and wherein the light source illuminates the visible surface of the storage tray or storage compartment.

22 Claims, 12 Drawing Sheets

(56) References Cited

U.S. PATENT DOCUMENTS

| | | |
|---|---|---|
| 5,009,821 A | 4/1991 | Weaver |
| 5,142,274 A | 8/1992 | Murphy et al. |
| 5,320,869 A | 6/1994 | Eisfeller et al. |
| 5,338,592 A | 8/1994 | Ohsumi et al. |
| 5,432,666 A | 7/1995 | Hodge |
| 5,514,317 A | 5/1996 | Rosica et al. |
| 5,525,179 A | 6/1996 | Stickling |
| 5,750,234 A | 5/1998 | Johnson et al. |
| 5,780,965 A | 7/1998 | Cass et al. |
| 5,918,396 A | 7/1999 | Jung |
| 5,939,979 A | 8/1999 | Lee |
| 6,108,059 A | 8/2000 | Yang |
| 6,186,633 B1 | 2/2001 | Zen et al. |
| 6,205,691 B1 | 3/2001 | Urda et al. |
| 6,228,486 B1 | 5/2001 | Kittel et al. |
| 6,312,787 B1 | 11/2001 | Hayashi et al. |
| 6,367,180 B2 | 4/2002 | Weiss et al. |
| 6,371,548 B1 | 4/2002 | Misaras |
| 6,444,317 B1 | 9/2002 | Haruta et al. |
| 6,444,319 B1 | 9/2002 | Berg et al. |
| 6,447,131 B1 | 9/2002 | Thompson et al. |
| 6,464,381 B2 | 10/2002 | Anderson, Jr. et al. |
| 6,481,864 B2 | 11/2002 | Hosseini et al. |
| 6,483,048 B1 | 11/2002 | Bontrager et al. |
| 6,497,947 B1 | 12/2002 | Blais et al. |
| 6,623,677 B1 | 9/2003 | Smith et al. |
| 6,652,128 B2 | 11/2003 | Misaras |
| 6,660,337 B2 | 12/2003 | Haruta et al. |
| 6,769,799 B2 | 8/2004 | Goto et al. |
| 6,773,129 B2 | 8/2004 | Anderson, Jr. et al. |
| 6,883,949 B2 | 4/2005 | Goto et al. |
| 6,974,238 B2 | 12/2005 | Sturt et al. |
| 7,014,908 B2 | 3/2006 | Yoneda et al. |
| 7,017,968 B1 | 3/2006 | Radu et al. |
| 7,078,451 B2 | 7/2006 | Hartman et al. |
| 7,150,550 B2 | 12/2006 | Bogdan et al. |
| 7,201,508 B2 | 4/2007 | Misaras |
| 7,237,933 B2 | 7/2007 | Radu et al. |
| 7,267,791 B2 | 9/2007 | Ricking et al. |
| 7,287,885 B2 | 10/2007 | Radu et al. |
| 7,357,095 B1 | 4/2008 | Fong et al. |
| 7,364,315 B2 | 4/2008 | Chien |
| 7,384,177 B2 | 6/2008 | Parker |
| 7,384,178 B2 | 6/2008 | Sumida et al. |
| 7,401,748 B2 | 7/2008 | Kitajima et al. |
| 7,401,758 B2 | 7/2008 | Liang et al. |
| 7,439,672 B2 | 10/2008 | Enz |
| 7,441,931 B2 | 10/2008 | Bayerdorfer et al. |
| 7,446,938 B2 | 11/2008 | Miyatake et al. |
| 7,456,569 B2 | 11/2008 | Wiebmeier et al. |
| 7,510,314 B2 | 3/2009 | Arai et al. |
| 7,518,672 B2 | 4/2009 | Tsai et al. |
| 7,534,017 B2 | 5/2009 | Barowski et al. |
| 7,674,414 B2 | 3/2010 | Neitzke |
| 7,798,548 B2 | 9/2010 | Embach et al. |
| 7,862,220 B2 | 1/2011 | Cannon et al. |
| RE42,340 E | 5/2011 | Anderson et al. |
| 7,981,342 B2 | 7/2011 | Hayes et al. |
| 7,985,008 B2 | 7/2011 | Kaisser et al. |
| 8,016,465 B2 | 9/2011 | Egerer et al. |
| 8,247,985 B2 | 8/2012 | Timmermans et al. |
| 8,256,945 B2 | 9/2012 | Choquet |
| 8,449,161 B2 | 5/2013 | Igoe et al. |
| 8,506,141 B2 | 8/2013 | Cannon et al. |
| 8,662,722 B2 | 3/2014 | Dixon |
| 9,103,516 B2 | 8/2015 | Schlemmer |
| 9,446,709 B2 * | 9/2016 | Salter .................. B60Q 3/54 |
| 2001/0028131 A1 | 10/2001 | Brodi, Jr. et al. |
| 2002/0007898 A1 | 1/2002 | Spica |
| 2002/0066973 A1 | 6/2002 | Visconti et al. |
| 2003/0016521 A1 | 1/2003 | Wang et al. |
| 2003/0044598 A1 | 3/2003 | Berg et al. |
| 2003/0072166 A1 | 4/2003 | Sinzawa et al. |
| 2003/0162045 A1 | 8/2003 | Ehrath et al. |
| 2004/0124659 A1 | 7/2004 | Vaitus et al. |
| 2004/0151014 A1 | 8/2004 | Speakman |
| 2005/0007759 A1 | 1/2005 | Parker |
| 2005/0206711 A1 | 9/2005 | Milini |
| 2005/0231935 A1 | 10/2005 | Kimmet et al. |
| 2005/0242607 A1 | 11/2005 | Neumann |
| 2006/0082173 A1 | 4/2006 | Cowelchuk et al. |
| 2006/0278853 A1 | 12/2006 | Yang |
| 2007/0009713 A1 | 1/2007 | Hoeschele |
| 2007/0047246 A1 | 3/2007 | Barowski et al. |
| 2007/0141353 A1 | 6/2007 | Neitzke |
| 2007/0194487 A1 | 8/2007 | Neitzke |
| 2007/0258228 A1 | 11/2007 | Hein et al. |
| 2008/0037287 A1 | 2/2008 | Krohn |
| 2008/0068857 A1 | 3/2008 | Meinke et al. |
| 2008/0074895 A1 | 3/2008 | Halbweiss et al. |
| 2008/0080163 A1 | 4/2008 | Grote, III et al. |
| 2008/0143132 A1 | 6/2008 | Okuda |
| 2008/0144333 A1 | 6/2008 | Gourlay |
| 2008/0157553 A1 | 7/2008 | Embach et al. |
| 2008/0157605 A1 | 7/2008 | Bowden et al. |
| 2008/0160243 A1 | 7/2008 | Moosheimer |
| 2008/0191231 A1 | 8/2008 | Park et al. |
| 2008/0199687 A1 | 8/2008 | Chiruvolu et al. |
| 2008/0217950 A1 | 9/2008 | Tiesler et al. |
| 2008/0219018 A1 | 9/2008 | Eich |
| 2008/0253140 A1 | 10/2008 | Fleischmann et al. |
| 2008/0297439 A1 | 12/2008 | Repetto et al. |
| 2009/0010022 A1 | 1/2009 | Tsai |
| 2009/0014116 A1 | 1/2009 | Takada et al. |
| 2009/0058118 A1 | 3/2009 | Hein et al. |
| 2009/0073708 A1 | 3/2009 | Kino et al. |
| 2009/0129107 A1 * | 5/2009 | Egerer .................. B60R 13/02 362/509 |
| 2010/0214795 A1 | 8/2010 | Salter et al. |
| 2010/0232171 A1 | 9/2010 | Cannon et al. |
| 2011/0002138 A1 | 1/2011 | Hayes et al. |
| 2012/0051067 A1 | 3/2012 | Murray |
| 2012/0063154 A1 | 3/2012 | Cannon et al. |
| 2012/0314438 A1 | 12/2012 | Gutt et al. |
| 2014/0211498 A1 | 7/2014 | Cannon et al. |
| 2015/0274067 A1 * | 10/2015 | Salter ................. H05B 37/0218 362/510 |
| 2015/0291085 A1 * | 10/2015 | Manning .............. B60Q 1/2619 362/516 |
| 2016/0154170 A1 * | 6/2016 | Thompson ........ G02F 1/133603 362/609 |
| 2017/0210275 A1 * | 7/2017 | Kubo ................... B60Q 1/0005 |
| 2017/0217366 A1 * | 8/2017 | Kraemer ................... B60Q 3/64 |

FOREIGN PATENT DOCUMENTS

| | | |
|---|---|---|
| DE | 102 60 831 B3 | 4/2004 |
| DE | 10 2004 044 035 A1 | 3/2006 |
| DE | 10 2004 060 810 A1 | 6/2006 |
| DE | 10 2005 005 682 A1 | 8/2006 |
| DE | 10 2005 036 533 A1 | 2/2007 |
| DE | 10 2005 047 500 A1 | 4/2007 |
| DE | 10 2005 052 534 A1 | 5/2007 |
| DE | 10 2005 952 534 A1 | 5/2007 |
| DE | 10 2006 016 068 A1 | 10/2007 |
| DE | 10 2006 012 606 A1 | 11/2007 |
| DE | 10 2006 044 911 A1 | 3/2008 |
| DE | 10 2007 041 678 | 3/2009 |
| DE | 10 2009 039 556 A1 | 3/2010 |
| DE | 20 2010 005 688 U1 | 10/2011 |
| DE | 10 2010 036 795 A1 | 2/2012 |
| DE | 10 2010 043 960 A1 | 5/2012 |
| DE | 10 2011 016 417 A1 | 10/2012 |
| DE | 10 2012 111 187 A1 | 5/2014 |
| DE | 10 2013 100 941 A1 | 7/2014 |
| EP | 0 979 760 A1 | 2/2000 |
| EP | 1 225 795 A2 | 7/2002 |
| EP | 1 418 090 A1 | 5/2004 |
| EP | 2 072 332 A1 | 12/2008 |
| EP | 2 060 444 B1 | 11/2009 |
| EP | 2 228 258 A2 | 9/2010 |
| EP | 2 233 366 A1 | 9/2010 |
| EP | 2 415 639 B1 | 7/2011 |

(56) References Cited

FOREIGN PATENT DOCUMENTS

| | | |
|---|---|---|
| EP | 2 269 797 B1 | 11/2013 |
| EP | 2 762 362 A1 | 1/2014 |
| EP | 2 732 965 A1 | 5/2014 |
| EP | 3 072 743 A1 | 9/2016 |
| FR | 2 747 971 A1 | 10/1997 |
| FR | 2 875 580 A1 | 3/2006 |
| FR | 2 877 896 A1 | 5/2006 |
| FR | 2 920 120 A1 | 2/2009 |
| FR | 2 920 717 A1 | 3/2009 |
| FR | 2 936 588 A1 | 4/2010 |
| FR | 2 937 929 A1 | 5/2010 |
| GB | 2 418 170 A | 3/2006 |
| GB | 2 438 440 A | 11/2007 |
| GB | 20040008347 | 11/2007 |
| GB | 2 489 813 A1 | 10/2012 |
| WO | 200194155 A1 | 12/2001 |
| WO | 2002061380 A2 | 8/2002 |
| WO | 2005070647 A1 | 8/2005 |
| WO | 2016059225 A2 | 4/2016 |

OTHER PUBLICATIONS

European Search Report dated Dec. 17, 2010 in European Patent Application No. 09179093.1.

European Search Report dated Nov. 23, 2011 in European Patent Application No. 11174840.6.

European Search Report dated Apr. 24, 2014 in European Patent Application No. 14151698.9.

European Search Report dated Nov. 15, 2016 in European Patent Application No. EP 16 15 4214.

Written Opinion of the International Searching Authority issued in WO2016059225, dated Apr. 15, 2016 (9 pgs).

Azo Materials, "Plastic Electronics via Inkjet Printing—Processing, Properties and Applications of Plastic Electronics," available at <<http://www.azom.com/Details.asp?ArticleID=2128>>; retrieved on Feb. 27, 2009.

Hakola, "Benefits of inkjet printing for priinted electronics," available at 222.vtt.fi/liitetiedostot/cluster5_metsa_kemia_ymparisto/PIRA%20Printed%20Electronics%202005%20Hakola.pdf, retrieved on Apr. 16, 2009.

I.T. Strategies, Inkjet Technology as a Manufacturing Process: Much Promise, But a Long Way Off; available at http://www.it-strategies.com/news/59.htm; retrieved on Feb. 27, 2009.

Mantysalo, et al., "Inkjet-Deposited Interconnections for Electronic Packaging," NIP23 and Digital Fabrication 2007 Final Program and Proceedings, Society for Imagining Science and Technology; pp. 813-817.

MIT Technology Insider, "For Computer Chips, Press 'Print'," available at www.technologyinsider.coml; retrieved on Apr. 14, 2009.

Nelson, "Materials Ink Jet Printing of Electronic Structures," National Nanotechnology Infrastructure Network; 2007 REU Research Accomplishments; pp. 70-71.

\* cited by examiner

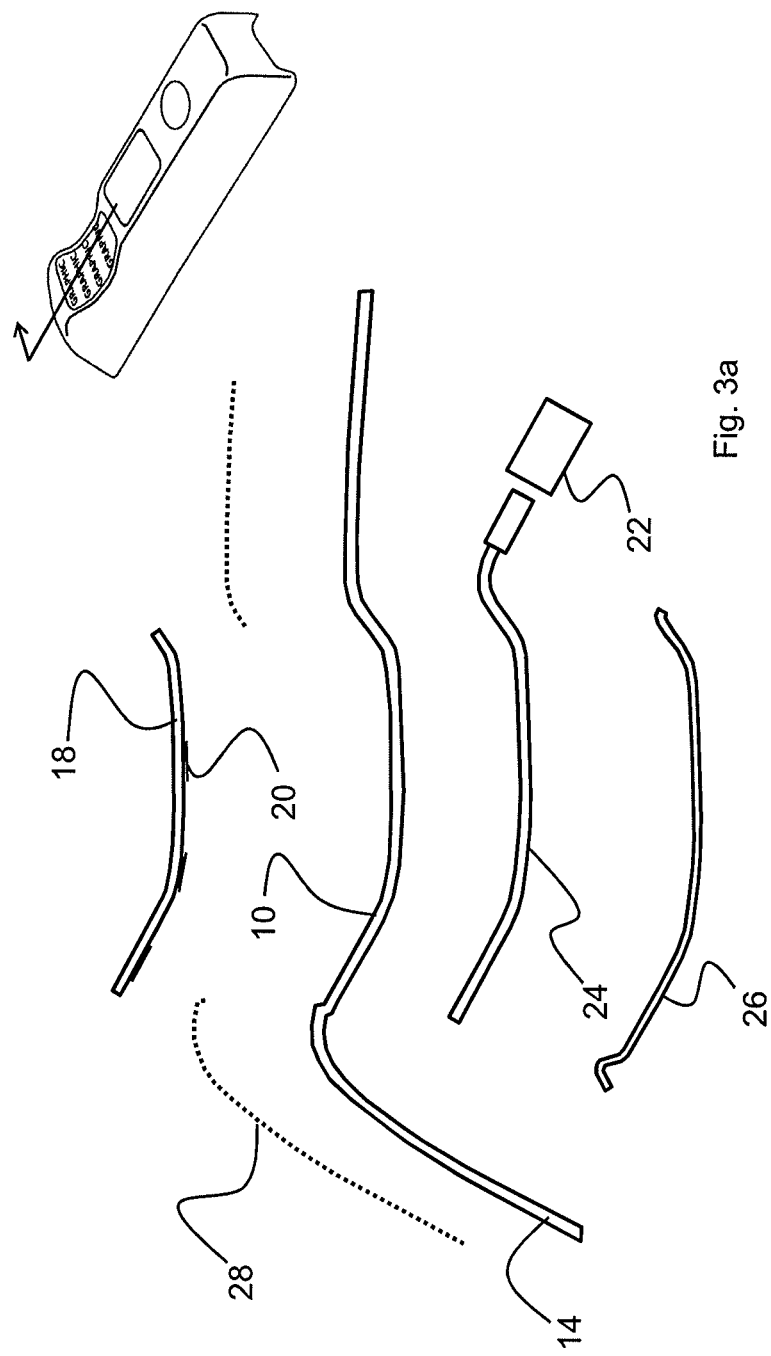

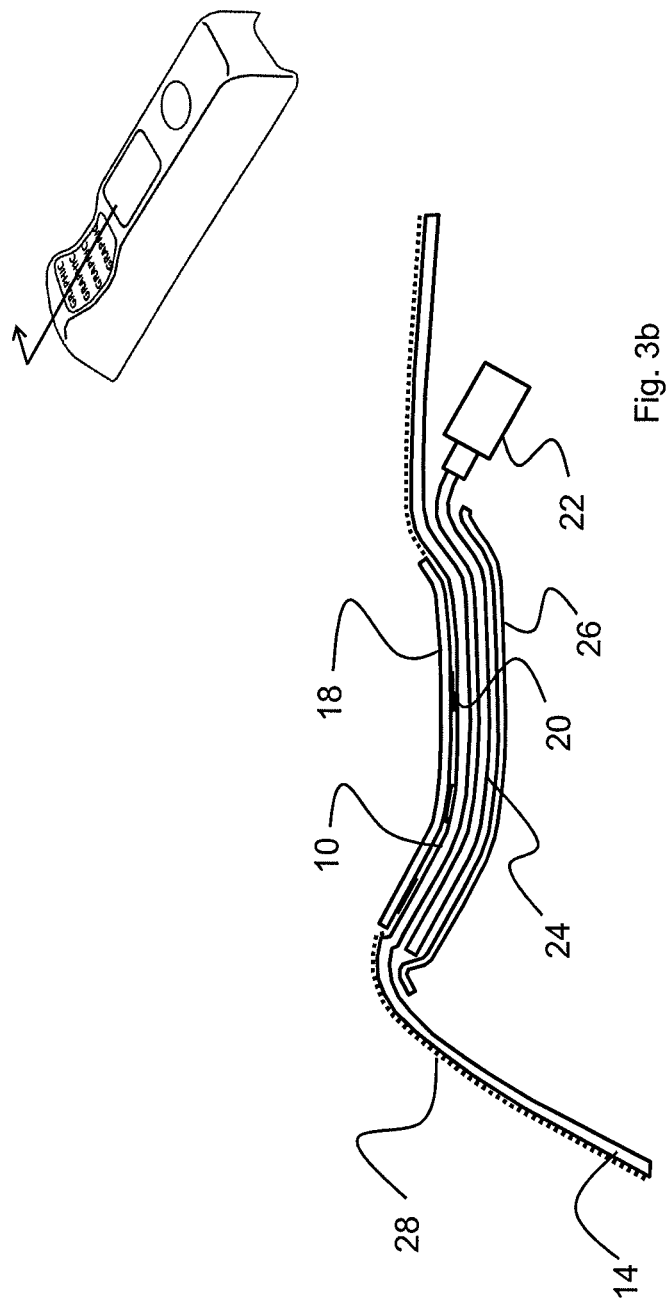

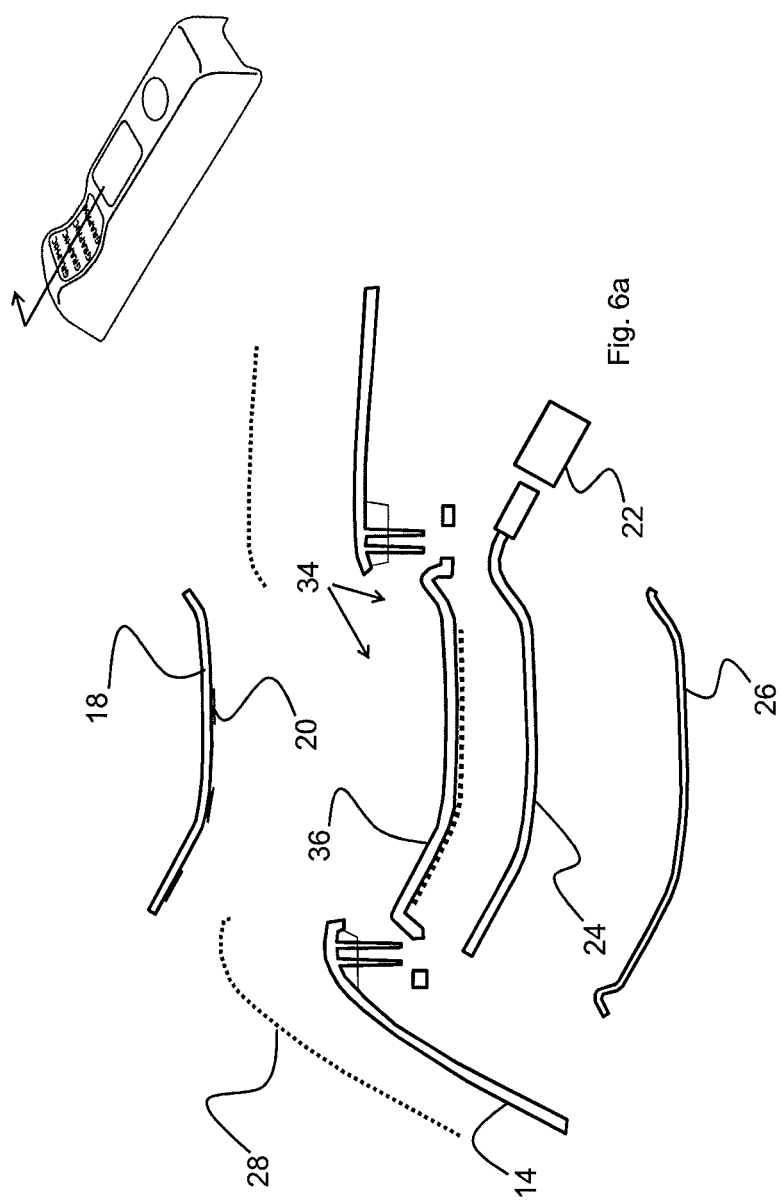

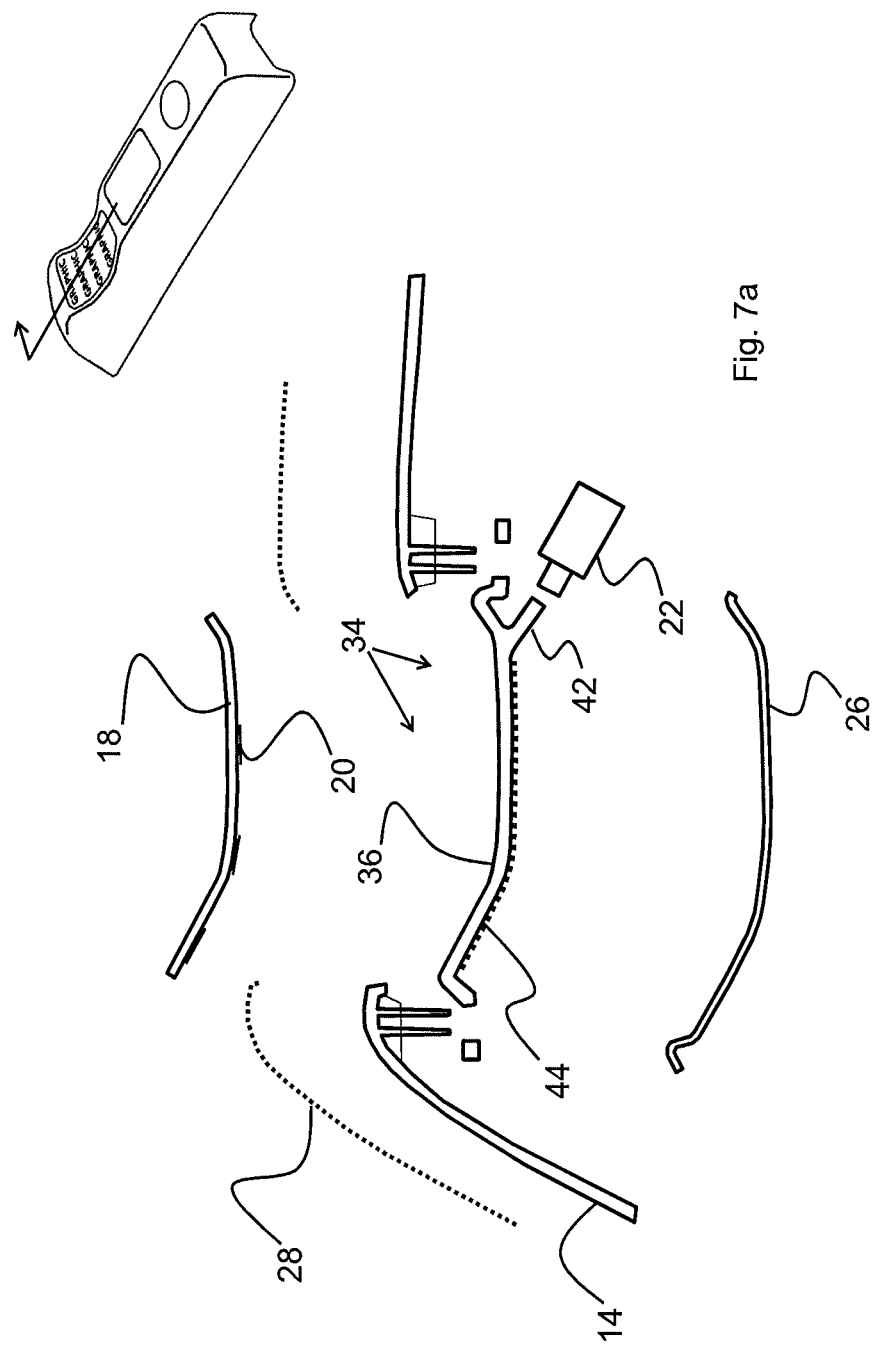

INTERIOR TRIM ELEMENT FOR A MOTOR VEHICLE

FIELD

The invention relates to an interior trim element for a motor vehicle that can provide lighting for the interior of the motor vehicle.

BACKGROUND

Interior lighting systems for motor vehicles can be used as room lighting or as ambient light in the interior of a motor vehicle, wherein these lighting systems may be realized in the form of background lighting and/or used for illuminating individual objects, and wherein this illumination may have a purely aesthetic function or also a technical function such as, e.g., simplifying the process of locating and/or operating different components in the interior of the motor vehicle. In the past, it was common practice to use light bulbs for the interior lighting, namely for lighting, as well as for the illumination of individual objects. LEDs and electroluminescent films are nowadays increasingly used for lighting purposes. It is furthermore known to integrate and embed lighting systems into interior trim elements, wherein such an integration is subject to different restrictions such as the heat output of the lighting systems, the susceptibility of the lighting systems to damages, as well as the accommodation of the lighting systems such that they are inconspicuous and integrate well into the interior trim elements.

EP 2 228 258 A2 of the applicant describes the integration of LEDs and associated drive electronics into interior trim elements. A relatively thin printed LED background lighting component with integrated diffuser is incorporated into an interior trim element during a molding process. The actual light source of the LED background lighting component is hidden behind a fabric surface or a screen or directly forms the outer surface of the interior trim element in order to provide lighting. A similar arrangement is disclosed in DE 10 2010 036 795 A1.

US RE 42 340 E describes an interior lighting system for a motor vehicle that utilizes electroluminescent panels arranged between a carrier substrate and a cover layer, wherein the cover layer is transparent. Recesses for accommodating the electroluminescent panel may be provided in the carrier substrate or the cover layer such that the panel does not stand out against the material of the cover layer and is imperceptible from outside.

EP 2 233 366 A1 also describes an interior trim element with a backlit decorative layer, wherein a light-conducting layer is arranged between a carrier substrate and the decorative layer.

In lighting systems that are integrated into the interior trim of a motor vehicle, the light-conducting and light-emitting layer is always located between a carrier substrate that defines the contour of the interior trim and a cover layer consisting of one or more layers. Since the light-emitting layer is embedded between the carrier substrate and the cover layer, the light-emitting layer is essentially imperceptible in the deactivated state and protected between the cover layer and the carrier substrate. However, these systems also have a number of disadvantages. In order to connect the light-emitting layer to the associated drive electronics and/or light sources and/or to supply the light-emitting layer with power, connections of the light-emitting layer are integrated into the carrier substrate or routed on the rear side of the carrier substrate such that they are accessible in order to be serviced and replaced, if so required. Connections of this type are described in DE 10 2010 036 795 A1.

DE 10 2013 100 941 A1 of the applicant describes an interior trim element for a motor vehicle having a carrier component that defines the contour of the interior trim element, a cover layer that is applied onto the front side of the carrier component and a light-emitting layer that is arranged on the rear side of the carrier component, wherein the carrier component and the cover layer are transparent. Due to the arrangement of the light source on the rear side of the carrier component, it is protected better than in the above-described prior art.

An objective can be seen in disclosing an interior trim element for a motor vehicle that makes it possible to broaden the potential applications of the interior trim element.

SUMMARY

According to one aspect, an interior trim element for a motor vehicle comprises a translucent carrier with a front side and a rear side, a translucent cover material on the front side of the carrier and a light source on the rear side of the carrier. The translucent cover material has a Shore A hardness in the range between 60 and 80, for example about 70, and therefore soft surface haptics. The interior trim element comprises at least one illuminated surface of a storage tray or storage compartment of the motor vehicle, namely the surface, on which objects are placed. The soft surface prevents objects placed thereon from shifting and/or from rattling or creating other undesirable noises. The light source is arranged in such a way that it illuminates the storage surface, which is visible to the driver or passengers of the motor vehicle. Due to the background lighting of a storage tray with soft haptics, it is possible to provide motor vehicles with storage trays or storage compartments that improve the User Experience for the passengers of the motor vehicle. The storage tray and objects placed therein can be located more easily and the objects are stored more securely.

According to another aspect, an interior trim element for a motor vehicle comprises a translucent carrier with a front side and a rear side, a translucent cover material on the front side of the carrier and a light source on the rear side of the carrier, wherein the composite consisting of the carrier and the translucent cover material has a light transmittance T (transmission factor) of 5% to 10% for visible light, e.g., in a wavelength range between 400 nm and 700 nm. It was determined that even a light source having relatively low luminous power such as, e.g., a 0.5 watt LED allows achieving a luminance (luminance) of the interior trim element between 2 and 4 cd/m$^2$ (cd=candela) or even between 2 and 5 cd/m$^2$ and therefore sound background lighting, wherein the lighting system is imperceptible in the interior of the motor vehicle as long as it is deactivated. This type of lighting is also referred to as hidden-until-lit.

The exact light transmittance values of the different components of the interior trim element may vary depending on the type of light source and any light conductors used, the composition and thickness of the carrier and the cover material, as well as the manner of fastening the cover material on the carrier. The light transmittance also differs for different wavelength ranges. For example, the composite consisting of the carrier and the translucent cover material may have a light transmittance T (transmission factor) between 5% and 10% in the visible wavelength range. The light transmittance of the carrier may be substantially greater than the light transmittance of the cover material, for example by a factor of 10 or more. As a result, the translucent carrier, the translucent cover material and the light source can be adapted to one another in such a way, for example, that background lighting with a luminance between 2 and 4 cd/m² or between 2 and 5 cd/m² or between 5 and 10 cd/m² or of about 4 d/m² or about 5 cd/m² is achieved.

According to another embodiment, an interior trim element for a motor vehicle comprises a translucent carrier with a front side and a rear side, a translucent cover material on the front side of the carrier and a light source on the rear side of the carrier, wherein the light source comprises a rear projection system that can be driven by an electronic control unit. In this way, static or dynamic images, graphics, animations or even movies can be displayed on the surface of the interior trim element. It is also possible to personalize and individualize the display for different users of the motor vehicle.

The different aspects, which were described in general above and are elucidated in greater detail below, can be arbitrarily combined unless exclusive technical alternatives are concerned.

If the interior trim element comprises a rear projection system, the control unit used may consist of a computer system that is detached from the motor vehicle such as, e.g., a smartphone, a smart-watch, a tablet computer or another portable computer. In this way, a different type of lighting including the display of dynamic images, movies, navigation information and the like can be provided for each user of the vehicle. Examples of rear projection systems are so-called micro, nano or pico projectors that utilize RGB laser modules such as, e.g., the projectors made by TriLite GmbH, Vienna, AT. Another manufacturer of such micro, nano or pico projectors is Apitek International, Willich, Del. One example of a projector system suitable for use is the Pico Genie P50 LED projector by AAXA Technologies Inc., CA, USA or its underlying technology, respectively.

If no rear projection system is used, the light source used may consist of or comprise—to name just a few examples—a light-conducting panel or optical fiber or a poly optic textile or formed fabric, for example of PMMA, a light-conducting film, a light conductor molded on the carrier, an LED light source such as an LED film, a laser light source, an electroluminescent component, a light box, optionally in combination with a reflector or combinations thereof.

A graphic, an image, a pattern, a structure or combinations thereof may be provided in different designs on the A-side and/or the B-side of the cover layer, i.e. on its visible side (A) and on its rear side (B) facing the carrier. The surface may be grained or structured in a different way. It is also possible to print the A-side and the B-side of the cover layer, for example, by means of inkjet printing or screen printing. Graphics, images, patterns, structures and combinations thereof may also lie in different planes of the cover layer in order to achieve a 3D effect or Moirè effect.

In some examples, the carrier component is only realized transparent within the illuminated area and opaque around the illuminated area, for example, by providing the carrier component with an opaque coating or paint layer. In other examples, a cutout is produced in the carrier component at the location, at which the illuminated area should be arranged, and a translucent insert is fitted into this cutout.

The cover layer of the interior trim element may consist of a film or comprise a film, for example a film consisting of or comprising TPO, TPU, TPE, PO, PVC or combinations thereof as the main constituent. On its B-side, the cover layer may be provided with an underlayer such as, for example, a PU or PO foam layer or with a knitted spacer fabric. The cover layer may furthermore feature a protective layer such as, for example, a coat of paint on its A-side.

Whenever it is mentioned in the context of this description that individual components consist of a certain material, this should be interpreted as the corresponding material forming the main constituent of the component, wherein other constituents may also be present in small quantities. It would also be possible to use mixtures of the cited material with other materials. It is furthermore possible to use additives, e.g., in the form of a UV stabilizers for preventing erosion and fading, dyes and pigments for designing the exterior appearance or foams for reducing the weight.

In one example, the cover layer is permanently connected to the carrier, particularly by means of a transparent adhesive. In another example, the cover layer is loosely placed on the carrier in the form of a mat or detachably fastened thereon.

It is also possible to mold or attach fastening structures such as, for example, clips, pins, hooks and/or eyelets on the cover layer.

SHORT DESCRIPTION OF DRAWINGS

Different examples of the invention are described in greater detail below.

FIGS. 1a and 1b respectively show schematic perspective representations of an example of an interior trim element with deactivated and activated lighting;

FIG. 2 shows an exploded view of the interior trim element according to FIG. 1;

FIGS. 3a and 3b respectively show sectional views of an example of a design of the interior trim element in exploded and in assembled form;

Figure 6B:
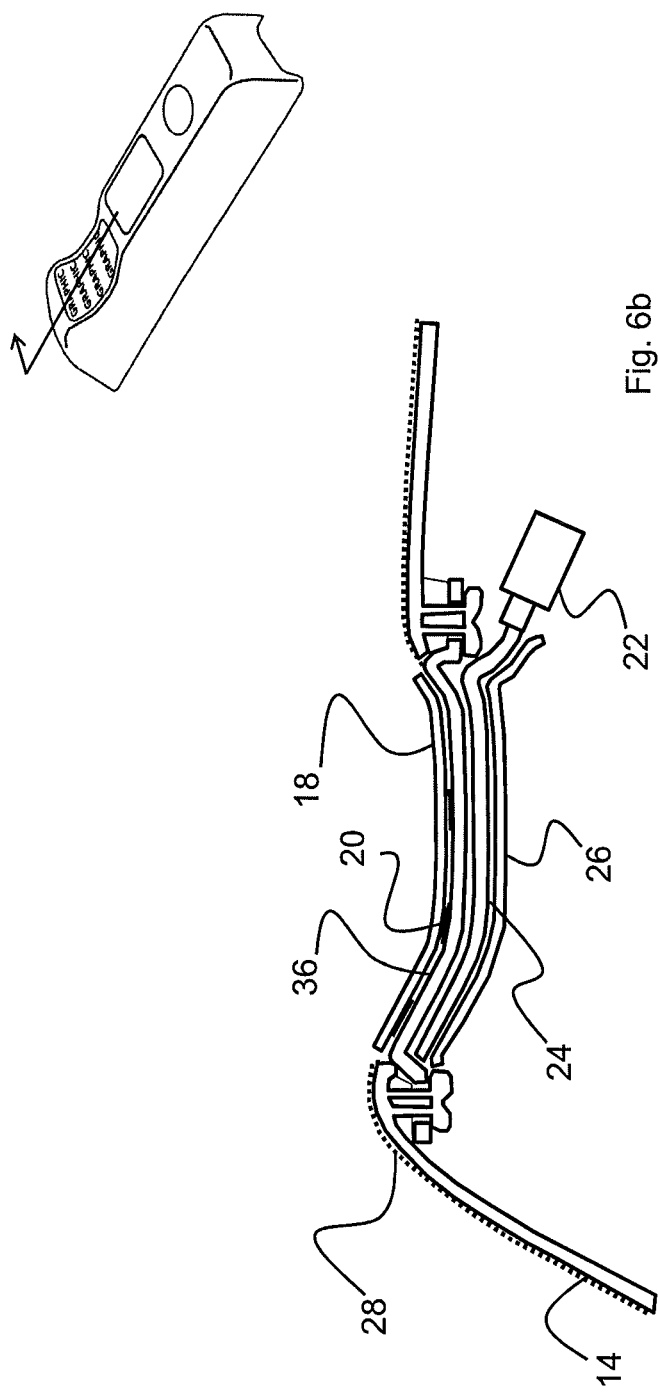
Figure 7B:
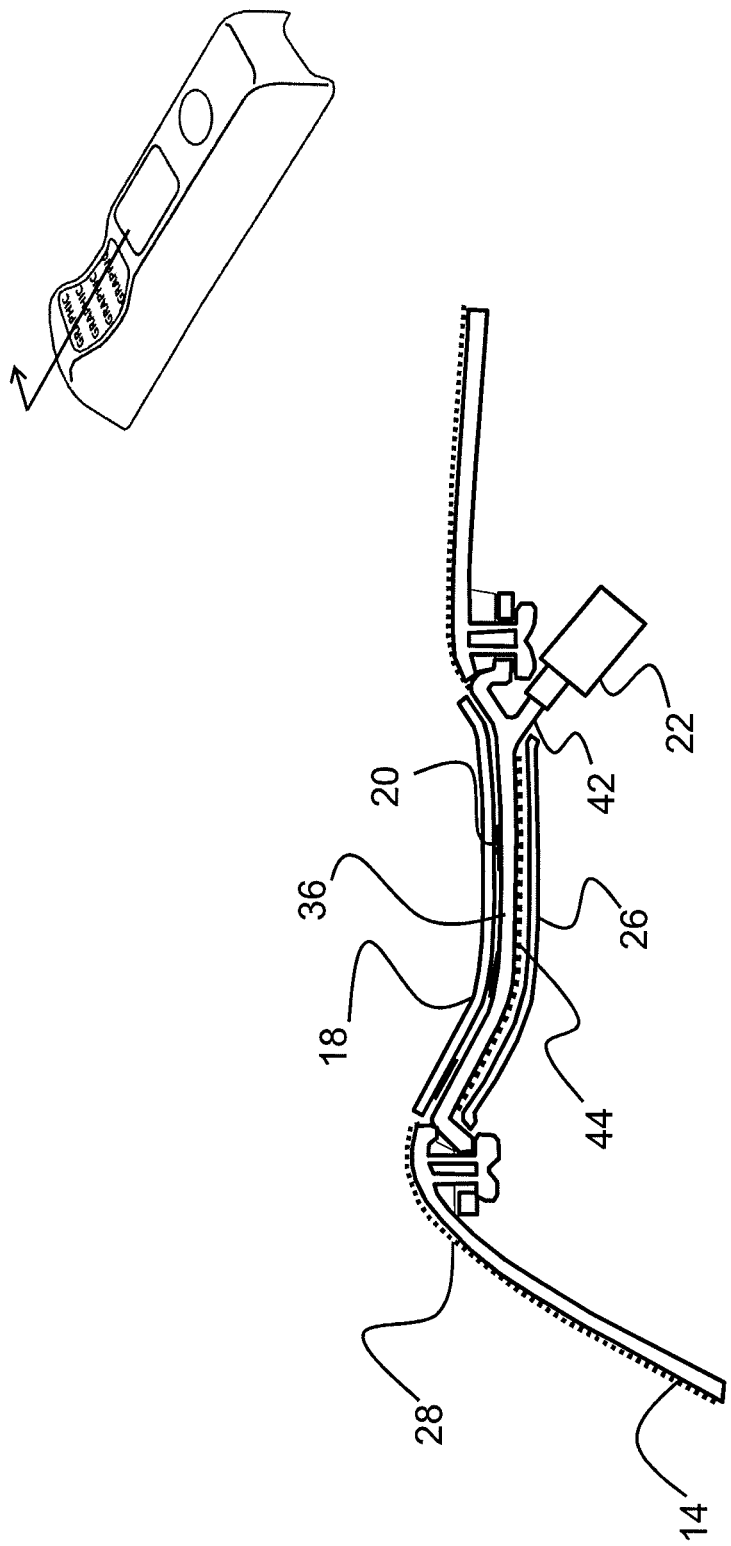
Figure 8B:
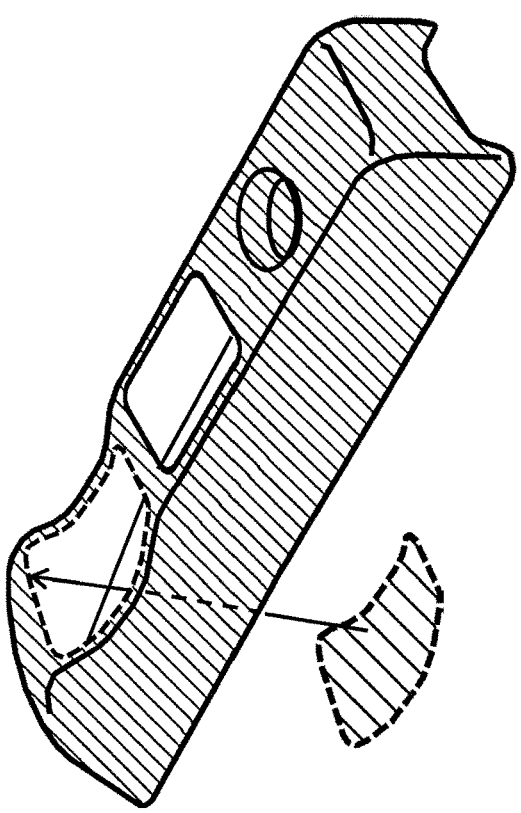
Figure 8C:
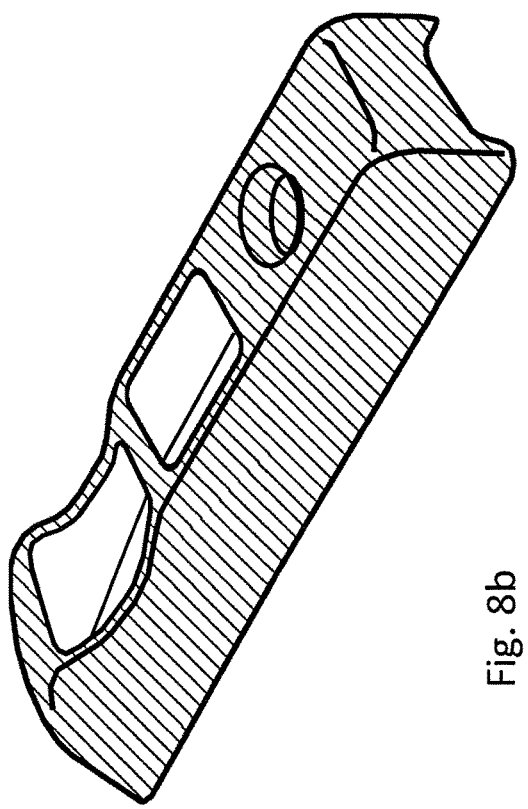
Figure 8A:
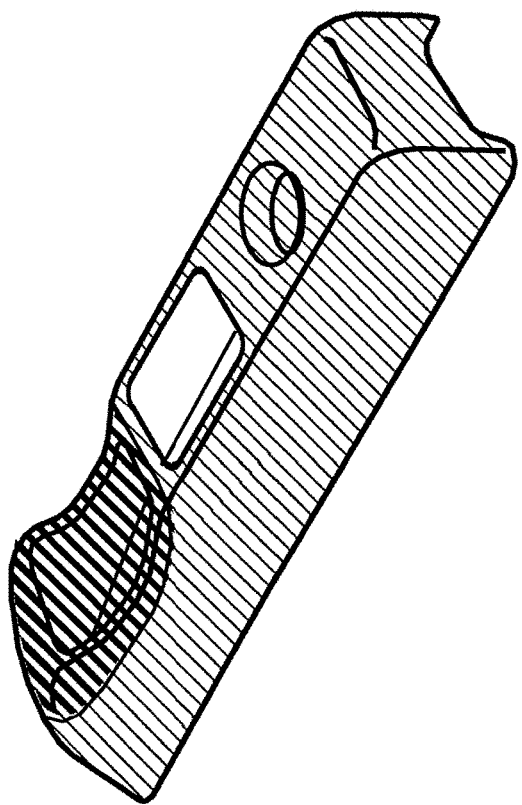
Figure 9:
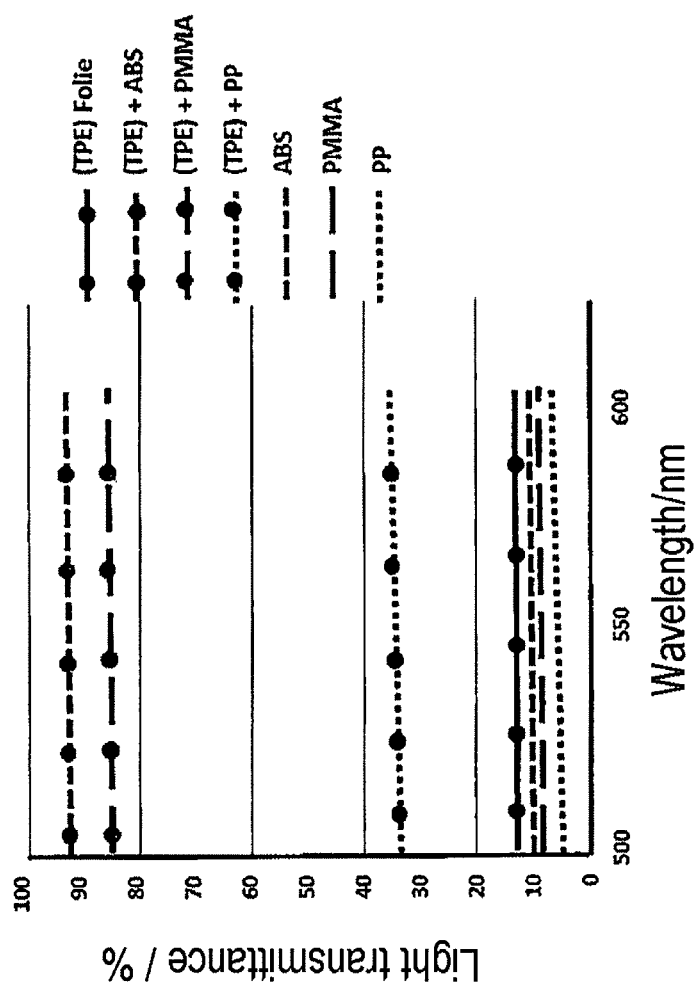

FIGS. 6a and 6b respectively show sectional views of another example of a design of the interior trim element in exploded and in assembled form;

FIGS. 7a and 7b respectively show sectional views of yet another example of a design of the interior trim element in exploded and in assembled form;

FIGS. 8a, 8b and 8c show different examples of the design of the carrier of the interior trim element; and FIG. 9 shows light transmittance values of different material combinations for different designs of the interior trim element.

DESCRIPTION OF EXAMPLES

The invention is elucidated below with reference to different examples. Unless they are technically exclusive, the characteristics of the different examples can be arbitrarily combined with one another, wherein this also includes the realization of subcombinations. The fact that individual embodiments are described as combinations of certain characteristics does not imply that the invention is limited to the specifically described combination. In fact, the different characteristics described with reference to certain examples are intended to serve for explaining different design options.

Figure 1B:
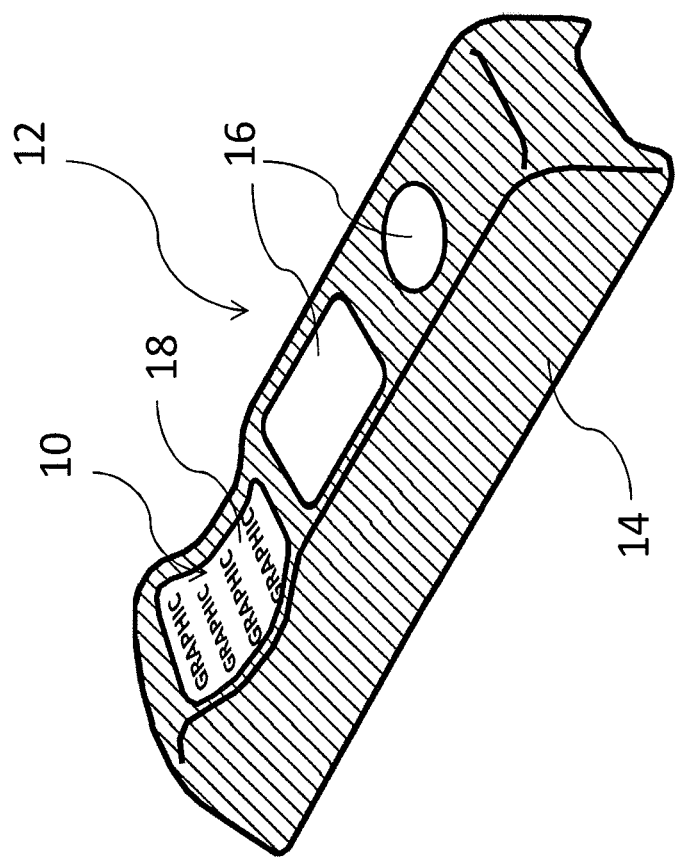
Figure 1A:
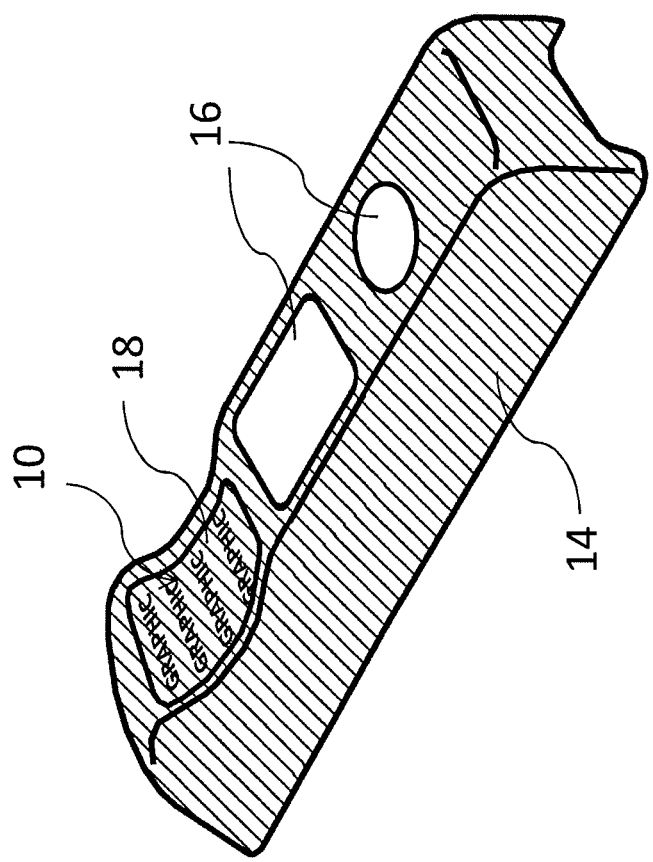

FIGS. 1a and 1b show an example of an interior trim element for a motor vehicle. In the example shown, the interior trim element comprises a storage surface 10 that forms part of a center console 12. The center console basically is formed from a component 14, in which different cutouts 16 for the gear shift lever, control elements, storage compartments and other installations are provided. The carrier component 14 is translucent at least in the region of the storage surface 10 or features a cutout with a translucent insert as described in greater detail 30 further below. A cover material 18, on which graphics are printed in the example according to FIGS. 1a and 1b, is positioned on the carrier component 14 in the region of the storage surface 10, wherein this cover material is likewise described in greater detail further below.

A light source is positioned on the rear side of the carrier component 14 in the region of the storage surface 10 in order to illuminate the storage surface 10. FIG. 1a shows the center console 12 with deactivated light source and FIG. 1b shows the center console 12 with activated light source, wherein the different illustrations are intended to visualize that the graphics printed on the cover material 18 are invisible or virtually invisible when the light source is deactivated (FIG. 1a) whereas these graphics are clearly visible when the light source is activated (FIG. 1b). This effect is also referred to as hidden-until-lit. The illumination of the storage surface 10 may serve as orientation light and as background or room lighting. In this case, the illumination takes place through multiple layers of translucent material, which comprise at least the translucent carrier or insert and the translucent cover material.

The carrier 14 of the center console or another interior trim element is in some examples made of a translucent or transparent material such as ABS (acrylonitrile-butadiene-styrene), PP (polypropylene), PC-ABS (polycarbonate ABS) and other materials for carrier components of interior trim elements. For example, the material of the translucent carrier is originally a white or largely colorless material. The carrier component may be manufactured by means of a molding process such as, for example, injection molding or transfer molding, vacuum molding, blow molding, rotational molding or other processes. The carrier component may form part of a larger carrier of an interior trim element. The carrier component may be painted or coated and thereby rendered partially opaque, wherein the sections to be illuminated remain unpainted or uncoated.

It is also possible to provide the carrier component with a cutout, for example, by means of punching, milling, laser cutting or water jet cutting in the region to be illuminated, e.g. in the region of the storage surface 10, and to replace this cutout with a separate translucent insert. In this case, the carrier component may also be made of a non-transparent material such as, for example, a fiber mat material. The translucent insert may be realized, for example, in the form of an element that consists of PP, ABS, PC-ABS, PMMA (polymethylmethacrylate) or mixtures thereof and is manufactured by means of injection molding or press-forming.

The separate translucent insert may feature a back-injection molded film of TPO (thermoplastic olefin), TPU (thermoplastic polyurethane), PU (polyurethane) or PVC such as, for example, a film known under the designation Smartfoil™. The translucent insert may also have other optical properties that are realized, for example, during the injection molding process, e.g., by utilizing an optically improved polymer or with integrated optical components such as lenses, reflectors or the like. However, optically effective elements may also be incorporated into the carrier material or a cover material in another processing step, for example, by means of etching or screen printing. Examples of materials for manufacturing the insert are PMMA and PC materials for light conductors such as, e.g., ACRYLITE™ LED 8N LD96 by Evonik Cyro LLC, NJ, USA. This material is a molding compound that has a low refractive index and a high constant spectral light transmittance of about 92% for perpendicularly incident visible light.

The separate translucent insert can be fastened on the carrier component in different ways, for example by means of clips, clamps, pins, hooks, hot-caulking, ultrasonic welding, bonding such as heat bonding, etc. Also in the embodiment without insert, the carrier component may furthermore feature fastening elements that are integrally molded thereon and serve for attaching the translucent cover material, e.g. clips, pins, hooks, eyelets and the like.

The carrier component or the insert may feature an interface for the light source such as, for example, a connection for light conductors of individual LED modules or other light sources or devices for attaching and connecting the light source. In some embodiments, the light source or parts of the light source may be detachably fastened on the carrier component or the insert, e.g., by means of clips or snap-on elements.

In some examples, graphic designs are provided on the carrier component or the insert, namely on the side facing the cover material and/or on the side facing away from the cover material. These graphic designs may be applied, for example, by means of inkjet printing, screen printing, laser printing, laser etching or the like.

As described in greater detail further below, the translucent cover material 18 may be fixed to the carrier component or loosely placed on the carrier component in the form of a mat or similar component and detachably connected thereto. In a few embodiments, the translucent cover material is realized in the form of a soft mat or film, the main constituent of which consists, for example, of TPO, TPU, PO (polyolefin) and PVC. The translucent cover material can be manufactured in different ways, for example, by means of injection molding or sintering, vacuum molding, casting or rotational molding and other known processes. The cover material may be grained or smooth. The grain may be produced during or after the molding process.

The translucent cover material can be laminated with a translucent backing material such as, for example, a polyolefin foam, a woven spacer fabric, a translucent formed fabric or a translucent knitted fabric. The surface of the translucent cover material can be designed and structured in different ways, for example provided with a grain. Known technologies of the applicant, which are suitable for use in this respect, are known under the designations Smartfoil™ and Fastcast™. In this case, the different materials of the translucent cover material and, if applicable, a backing layer, as well as of the translucent carrier, should be carefully adapted to one another so as to achieve an adequate light transmittance and a homogenous distribution over the surface of the interior trim element. The materials should preferably also be UV-resistant and heat-resistant.

The translucent cover material can be directly provided with a graphic, an image, a pattern or the like by printing the corresponding design on the A-side, the B-side or both sides of the cover material. Two alternative examples for applying the graphic, image, pattern or the like are inkjet printing and screen printing. For example, decorative patterns, the brand or name of the motor vehicle, logos, emblems, as well as any other graphic designs and images, may be applied. It is also possible to adapt the printed graphics to a structuring of the surface of the cover material, for example, in order to enhance or simulate a three-dimensional structure such as a wood structure or tree bark structure. A three-dimensional effect or Moiré effect can be achieved by printing the cover material in different planes and superimposing the different structures.

In some examples, the translucent cover material has soft haptics such as a Shore A hardness in the range between 60 and 80, for example about 70. The Shore hardness is a material parameter for elastomers and plastics that is defined in standards DIN ISO 868 and DIN ISO 7619-1. A Shore hardness test measures the penetration depth of a spring-loaded pin of hardened steel into a material to be tested and derives the Shore hardness from the penetration depth (for example, 0 Shore at 2.5 mm penetration depth and 100 Shore at 0 millimeter penetration depth). A high Shore hardness therefore means that the material has a great hardness. In a Shore A test, the sample to be measured is acted upon, for example, with a force of 12.5 Newton. The measurement is carried out at an ambient temperature of about 23° C. and the material thickness should amount to at least 6 mm. A test pin may have an end face in the form of a truncated cone with a diameter of 0.79 mm and an aperture angle of 35°. The applied weight amounts to 1 kg and the hold time is about 15 s. It is also possible to use other test methods such as the scleroscope hardness test (a dynamic test, in which the hardness is determined based on the rebound of a hammer) or a durometer.

Soft haptics of the translucent cover material are achieved due to a Shore hardness in the range between 60 and 80, for example about 70, such that objects placed on the cover material can be prevented from rattling, vibrating, shifting or the like. This effect can be enhanced with a patterned and/or grained surface of the cover material.

The transmission factor or the light transmittance of the carrier, the cover material and, if applicable, any intermediate layers and/or adhesive layers can be determined independently for all individual components and for the assembled interior trim element as a whole, as well as for subcombinations thereof. The light transmittance of the interior trim element is ultimately defined by the composite of materials, wherein the light transmittance of the carrier component may be substantially higher than the light transmittance of the cover material, for example by a factor of 10 or more. All in all, the light transmittance of the composite consisting of carrier component and translucent cover material for visible light may in different examples lie, for example, in the range between 5% and 10%. FIG. 9 shows different light transmittance values for various material combinations of carrier component and cover material at different wavelengths.

The light transmittance can be determined, for example, by means of infrared spectroscopy, in which infrared radiation passes through the material sample. The resulting spectrum represents the molecular absorption and the transmission and thereby forms a "molecular fingerprint" of the sample. The higher the light transmittance, the higher the transmission factor of the material. The exact values of the transmission factor of the interior trim element depend on the chosen materials and layer thicknesses, as well as on the technology used for the light source, the luminescence and other specifications of the light source.

A broad variety of different technologies can be used as light source and may comprise, but is not limited to, the following technologies:

Light-conducting panels of PMMA or other optically effective polymers that are coupled to one or more LEDs, optionally including edge lighting; polyoptic fibers, for example, of PMMA or glass that are woven, knitted or otherwise processed into fabrics in order to form flexible, ductile room lighting that is subsequently coupled to one or more LEDs; background lighting integrated into the carrier with integral optical structures that are produced, for example, by means of molding or laser printing, optionally including a reflector and possibly coupled to one or more LEDs; OLEDs, i.e. organic LEDs; electroluminescent components such as films or panels.

In one or more examples, it is also possible to utilize so-called micro, nano or pico projectors as light source. Such micro, nano or pico projectors are known and use projection systems that are based, e.g., on laser LEDs or RGB-LEDs. These systems can be used for projecting static or dynamic images on the rear side of the translucent carrier component. It is basically possible to project all types of images, patterns, structures and movies including personalized static or moving images, moving patterns, movies, navigation information and information regarding the vehicle status, functional information and many other items.

The rear projection systems can be driven by a computer that is detached from the vehicle such as, for example, a smartphone, a smart-watch, smartglasses, a tablet computer or another portable computer. One known system is the Pico-Projector by Micron Technologies, which has a size of only about 9 mm×5 mm×5 mm and weighs only about 1.5 g. This system can also be coupled to the onboard electronics of the vehicle or directly or indirectly coupled to intelligent control devices that operate independently of the vehicle. The control devices send images and/or data in the form of electronic signals in order to drive the laser light source or LED light source.

Different examples of the invention are described below, wherein the above-described and other characteristics and combinations of characteristics of the interior trim element may be used in these examples. The interior trim element may serve as a storage surface of a storage tray or storage compartment of a motor vehicle, for example on the center console of a motor vehicle, in a beverage holder, in a storage compartment of the door trim panel, in a glove compartment, etc. However, it can also be used in connection with other interior trim elements such as, for example, the interior trim panels of the doors including storage compartments in the doors, inserts, armrests, the interior trim of columns and sidewalls, the roof liner and similar components including floor systems such as cargo floors, hat racks, glove compartments and storage trays in and on the instrument panel. The illumination simplifies the orientation, as well as placing and locating objects on the storage surface, and is typically arranged where it is visible to the passenger and the driver of the motor vehicle. The illumination may additionally serve for the orientation and fulfill decorative purposes.

Figure 2:
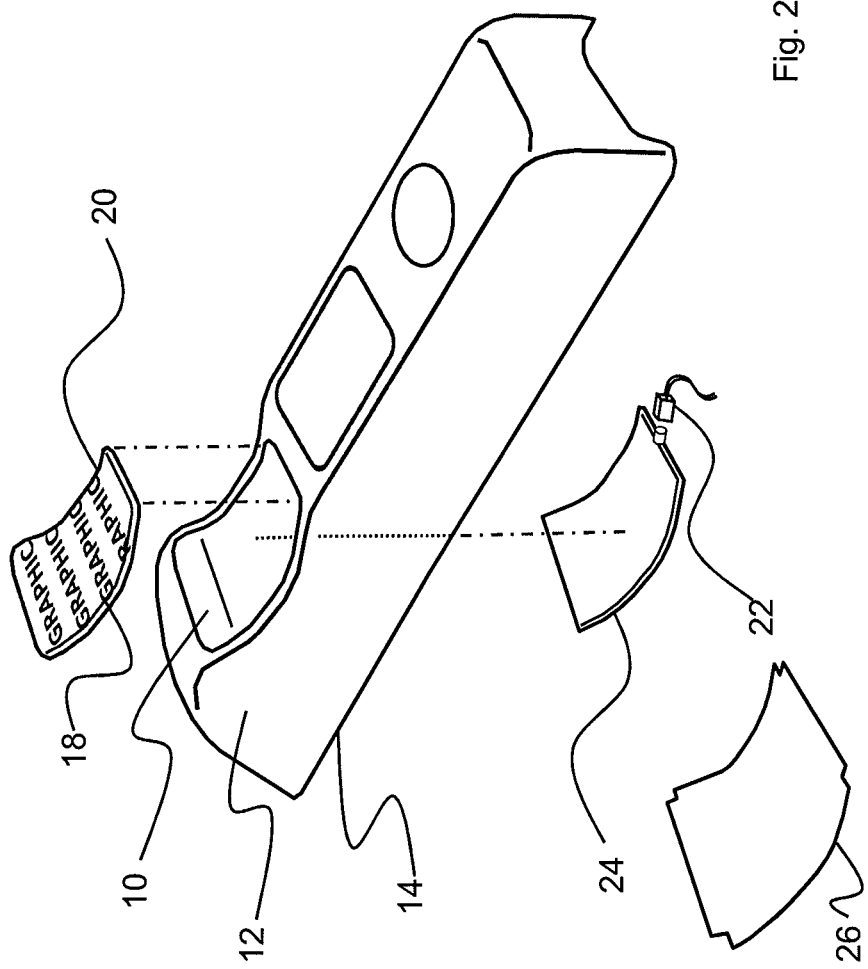

FIG. 2 shows an example of the center console according to FIGS. 1a and 1b in the form of an exploded view. The center console 12 comprises the carrier component 14 that is made, for example, of transparent or semitransparent ABS, PP or another plastic material. The carrier component 14 may be coated with a paint or film everywhere except in the region of the storage surface 10 and thereby rendered non-transparent (opaque) outside the storage surface 10. In the region of the storage surface 10, a transparent or semi-transparent or translucent cover material 18, which is made, e.g., of TPO, TPE, PO or other materials, is applied on the storage surface 10. The cover material 18 may be provided with graphics 20 that are applied, for example, by means of digital inkjet printing, screen printing, laser printing or other paint application methods.

An LED module 22 is arranged on the rear side of the carrier component 14 and coupled to a background lighting device 24. The LED module 22 and the background lighting device 24 jointly form the light source. The background lighting device 24 may be realized, for example, in the form of a textile layer of PMMA, a light-conducting panel or light-conducting film, a light box or a background lighting device that is integrated into the carrier component 14.

In the example of FIG. 2, the light source is covered by a light exclusion device 26 such as an opaque carrier, an opaque plate, a film or the like on its rear side, i.e. on the side facing away from the carrier component 14, in order to prevent light from being emitted by the light source on the rear side of the carrier component.

In the example FIG. 2, the cover material may be rigidly connected to the carrier component, for example by means of laminating or bonding, wherein this is preferably realized by utilizing a transparent adhesive such as a transparent two-sided adhesive tape, a transparent spray-on adhesive or another transparent adhesive coating. The cover material 18 may alternatively or additionally also be connected to the carrier component 14 with mechanical fastening means such as separate or integral clips, hooks, pins, eyelets and the like. The cover material 18 may also be loosely placed on the carrier component 14 and merely adhere thereto due to the force of gravity and friction or be received with a mounting in a form-fitting fashion or a combination thereof. A connection by means of hook-and-pile fasteners or other easily adhering materials is also conceivable. It would be possible, for example, to provide a two-sided adhesive film with different adhesive properties that is permanently or detachably connected to the cover material 18 with one side and permanently or detachably bonded to the carrier component with its other side. The adhesive film may be applied to the cover material beforehand and covered with a protective film that is removed in order to ultimately attach the cover material to the carrier component. The adhesive strength may be adjusted differently and include a tack effect, in which case the cover material is affixed to the carrier component similar to an adhesive label or a sticky note, which is also referred to as Post-It.

The example of FIG. 2 is illustrated also in FIGS. 3a and 3b in exploded and assembled form. The same reference symbols are used. In this context, reference is made to the description of FIG. 2. FIGS. 3a and 3b also show the opaque coating 28 of the carrier component that may be applied, for example, in the form of a paint or film.

Figure 4:
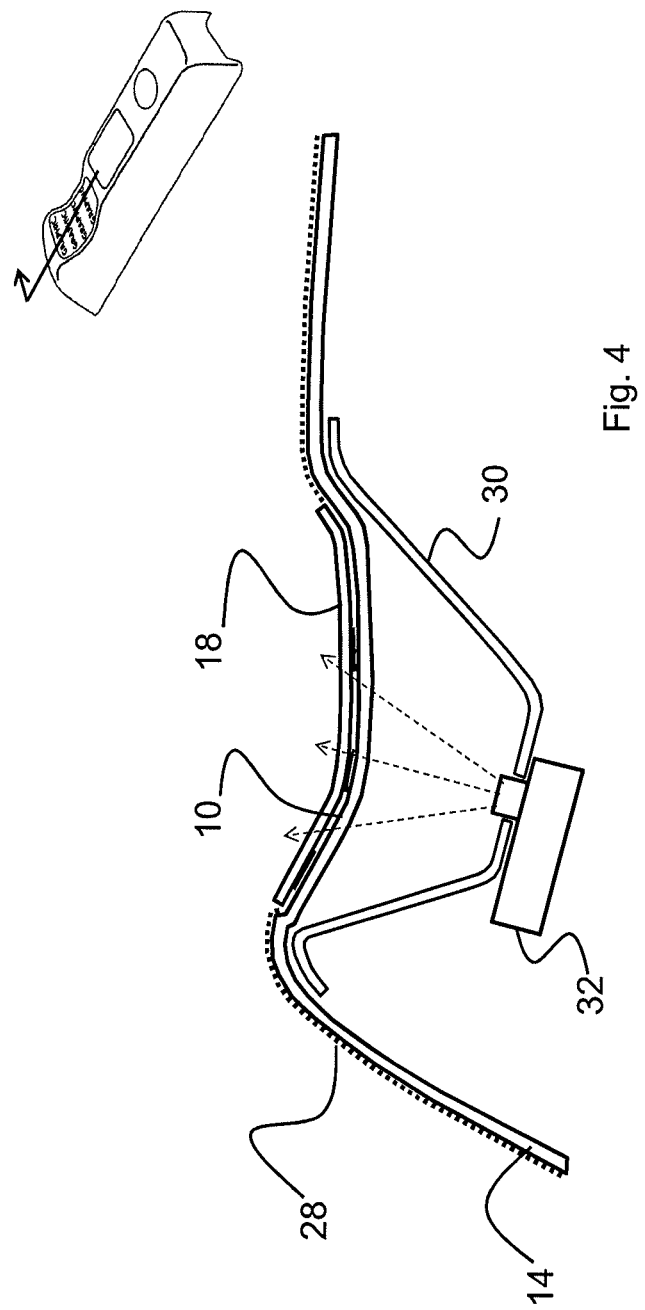
FIG. 4 shows a sectional view of another example of an interior trim element.

FIG. 4 shows an alternative example of the interior trim element. Analogous to the preceding examples, the interior trim element comprises a carrier component 14 that is coated with a paint or film 28, wherein the coating is only applied outside the storage surface 10. The cover material 18 lies in the region of the storage surface 10, wherein the cover material is translucent and the carrier component 14 is translucent in the region of the storage surface 10 as described above, and wherein the cover material 18 has a soft surface as also described above.

The interior trim element according to FIG. 4 comprises a light source in the form of a rear projection system that consists of a light box 30 or "closeout" and a micro, nano or pico projector 32. The light box or closeout 30 essentially forms a mounting for the projector 32. Micro, nano and pico projectors are miniature projectors of the above-described type that are designated differently depending on the manufacturer. Nowadays, the most common designation for such small portable projector systems is pico projector whereas the designation micro projector is frequently used for integrated or embedded projector systems of the type used, for example, in smartphones or similar devices. A definitive unambiguous designation does not exist to date.

Such micro, nano or pico rear projection systems 32 can be used for providing static or dynamic background lighting of the storage surface 10 including static and dynamic images, patterns, graphics and personalized displays as described above.

Figure 5:
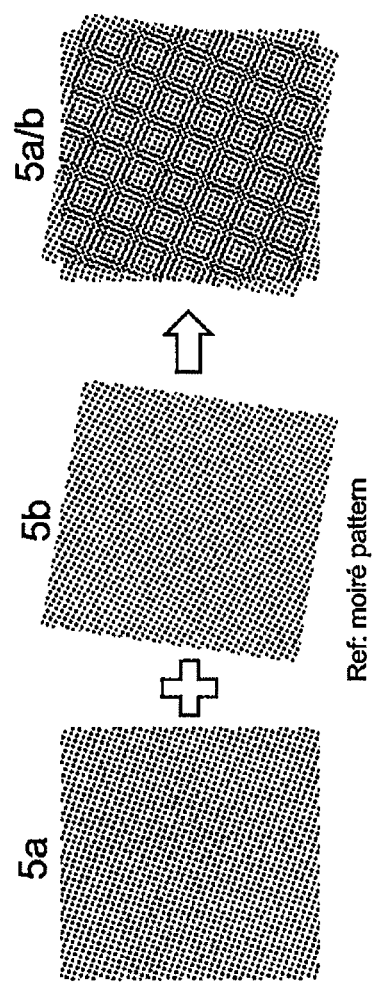
FIG. 5 shows options for the graphic design of the cover material according to an example in order to achieve a Moirè effect.

Also the cover material 18 as such can be designed, namely in connection with a static light source or a rear projection system, wherein graphics and images or even geographic patterns may be printed on the A-side and/or the B-side of the cover material in one or more layers. FIG. 5 shows the example of producing a three-dimensional or Moirè effect by printing two offset geometric patterns in different planes of the cover material, for example, on its front side and its rear side. The graphic 5a/b shows the superposition of the two graphics 5a and 5b.

FIGS. 6a and 6b show another example of an interior trim element, wherein FIG. 6a shows the interior trim element in exploded form and FIG. 6b shows the interior trim element in assembled form.

In the example of FIGS. 6a and 6b, the carrier component 14 features a cutout 34 in the region of the translucent storage surface. The carrier component 47 may consist of an opaque material such as dyed ABS, PP or even a fiber material and/or be coated with an opaque paint or film 28. A transparent or translucent insert 36 of plastic, which is manufactured, for example, by means of injection molding or transfer molding, may be fitted into the cutout 34 and rigidly connected to the carrier component 14. The insert 36 forms the storage surface in the finished trim element. It may be patterned, provided with graphics and/or with optical elements on its rear side and/or on its front side as indicated with a broken line. In the example shown, the insert 36 is connected to the carrier component 14 by means of hot-caulking, wherein the carrier component 14 features in this example connecting pins or correcting webs 38 that are distributed over the circumference of the cutout 34, engage into corresponding recesses 40 in the insert 36 and are deformed by means of hot-caulking as illustrated in FIG. 6b. In this way, a positive fit and a non-positive of frictional connection, as well as a partially integral connection, is produced between the insert 36 and the carrier component 14.

It is also possible to provide other types of connections including separable connections produced by means of clips, pins, hooks, eyelets and the like or inseparable connections produced by means of welding, bonding, riveting and other suitable connecting techniques.

In the embodiment according to FIGS. 6a and 6b, a translucent cover material 18 is also applied in the region of the storage surface defined by the insert 36, wherein said cover material may be optionally provided with graphics 20 on its A-side and/or B-side. The translucent cover material 18 may lie on the insert 36 in the region of the storage surface or be detachably or permanently connected thereto.

As in the embodiment according to FIGS. 3a and 3b, an LED module 22, a background lighting device 24 and a light exclusion device 26 are arranged on the rear side of the carrier component. However, these elements merely serve as an example of a light source of the interior trim element, wherein other light sources and lighting systems can be used including all of the above-described examples and the rear projection system illustrated in FIG. 4.

Another example of the interior trim element is illustrated in FIGS. 7a and 7b. This example can be distinguished from the example according to FIGS. 6a and 6b in that the insert 36 forms a lighting module, wherein the LED module 22 is directly connected to the lighting module in the form of the insert 36 by means of a light conductor 42. For this purpose, the insert 36 may be made of a light-conducting material such as PMMA or PC, e.g. of polymers by Evonik such as PMMA ACRYLITE™ LED 8N LD96. In addition, optical elements 44 may be molded or produced by means of secondary processing such as laser processing or printing on the rear side of the insert 36. These optical elements may comprise, for example, a faceting, reflector elements or other elements for directing and/or amplifying the light.

In other respects, reference is made to the description of FIGS. 6a and 6b, as well as the above-described examples for designing the different components of the interior trim element.

In the examples illustrated in FIGS. 2-7, the individual components may consist of one of the above-described materials and have the above-described properties with respect to their translucence, strength, haptics and other patterning, printing and the like. In some examples, the carrier component 14 is made of transparent or semitransparent ABS, PP, PP-ABS or another suitable material by means of injection molding, press-forming, vacuum molding, blow molding or another suitable process. When using a carrier component with a cutout, into which a translucent insert is fitted, it is also possible to use opaque materials that are based, for example, on fiber mats.

The cover material may consist, for example, of transparent TPO, TPE, TPU, PO or PVC, wherein graphics can be applied, for example, by means of digital printing such as inkjet printing, screen printing or laser printing or by means of a paint application with the aid of a mask. In addition, the cover material may be structured on its upper side and/or its underside, wherein the structure is produced when the cover material is molded or by means of subsequent processing such as, for example, laser processing or etching.

The carrier component 114 may be additionally provided with a coating 28, wherein said coating may consist, for example, of a paint or film. It is also possible to dye the carrier component 14 itself.

The carrier component and the cover layer may be permanently or detachably connected to one another, wherein it is also possible to place and mechanically fix the cover layer on the carrier component. Transparent adhesives, in particular, may be considered for this purpose. The cover layer may also be back-injection molded in order to produce the carrier component.

A combination of an LED module or another lamp and a background lighting device may serve as light source, wherein the background lighting device may comprise a panel, a film, a textile or a nonwoven structure with light conducting properties, for example of PMMA. It would alternatively also be possible to use a rear projection system with a light box and a micro to pico projector.

A light exclusion device may be provided on the rear side, i.e. on the side of the light source that faces away from the carrier component, in order to prevent light from being emitted on the rear side of the carrier component.

FIGS. 8a, 8b and 8c once again schematically show perspective representations of different variations of an interior trim element using the example of a center console.

In FIG. 8a, the surface of the carrier component is partially/locally covered with translucent cover material in order to form the storage surface. The translucent cover material may consist of a back-injection molded film or a laminated film.

In FIG. 8b, the entire interior trim element is provided with a cover material, wherein the cover material may once again consist of a back-injection molded or laminated film.

In FIG. 8c, the interior trim element features a recess, into which a transparent or translucent insert is fitted.

FIG. 9 shows an example of a curve of the light transmittance of different materials and material components in dependence on the wavelength of the light. It can be gathered that the composite consisting of the carrier and the translucent cover material has a light transmittance T (transmission factor) that respectively lies between about 1 and 20%, particularly between 5 and 15% or between 5% and 10%, or is lower than 15% in the visible wavelength range, which is indicated as the range between 400 nm and 600 nm in this example. The light transmittance of the interior trim element can be adjusted by choosing a corresponding material and thickness of the carrier or the insert, of the cover material and, if applicable, of other material layers and adhesive layers, as well as by correspondingly processing and designing the surface of the individual layers of the interior trim element.

The diagram according to FIG. 9 shows the transmission curves of

ABA, PMMA and PP, which may be used as material for the carrier component or the insert, TPE, which may be used as cover material, and different material combinations for the carrier component and the cover material, namely: ABS+TPE, PMMA+TPE and PP+TPE.

In the example shown, the material of the carrier component or insert respectively has a light transmittance of about 80% to 95% (for ABS and PMMA) and of about 30% to 40% (for PP). The cover material (TPE) has a light transmittance of about 10 to 15%, particularly about 12%. This results in a light transmittance of about 5% to 10% for the composite consisting of the carrier or insert and the cover material.

All these values merely serve as examples for illustrating the invention.

What is claimed is:

1. An interior trim element for a motor vehicle, comprising:
a translucent carrier component having a front side and a rear side, wherein the front side comprises a storage surface of a storage tray and/or a storage compartment to receive at least one object for storage,
a translucent cover on at least a portion of the storage surface of the front side of the carrier component,
a light source on the rear side of the carrier component, the light source operable to emit visible light which is directed to provide background lighting of the interior trim element,
wherein the translucent carrier component and translucent cover form a composite having a light transmittance (T) of visible light in a range between 1% and 20%,
wherein the translucent cover is visible to a passenger when the interior trim element is installed within the motor vehicle,
wherein, when visible light is provided from the light source, the interior trim element is arranged such that the visible light from the light source provides background lighting which illuminates at least a portion of the translucent cover, with the visible light passing through the composite from the translucent carrier component to the translucent cover,
wherein the translucent cover is formed of a material having a Shore A hardness in a range from 60 to 80; and wherein, when at least the portion of the translucent cover is illuminated with the background lighting, the translucent cover displays functional information regarding the motor vehicle.

2. The interior trim element according to claim 1, wherein the light source comprises a rear projection system.

3. The interior trim element according to claim 2, wherein the rear projection system is driven by a control unit, and displays different static or moving images.

4. The interior trim element according to claim 3, wherein the control unit comprises a computer, and the control unit is detachable from the motor vehicle.

5. The interior trim element according to claim 1, wherein the storage tray or the storage compartment is disposed on a console.

6. The interior trim element according to claim 1, wherein the light source comprises a light-conducting panel, an optical fiber, a light-conducting film, a polyoptic textile, a formed fabric, a light conductor molded on the carrier, a reflector, an LED light source, a laser light source, an electroluminescent component, a light box or a combination thereof.

7. The interior trim element according to claim 1, wherein the translucent cover has a light transmittance of about 12% in the visible wavelength range.

8. The interior trim element according to claim 7, wherein the light transmittance of the translucent carrier component is higher than the light transmittance of the translucent cover by a factor of 10 or more.

9. The interior trim element according to claim 1, wherein the material of the translucent cover has a Shore A hardness of about 70.

10. The interior trim element according to claim 1, wherein the translucent cover includes a surface that faces away from the translucent carrier component and a surface that faces the translucent carrier component and said translucent cover is provided with a graphic, an image, a pattern, a structure or combination thereof on at least one of the surface that faces away from the translucent carrier component and the surface that faces the translucent carrier component.

11. The interior trim element according to claim 10, wherein the graphic, the image, the pattern, the structure or the combination thereof comprises paint disposed on at least one of the surface that faces away from the translucent carrier component and on the surface that faces the translucent carrier component.

12. The interior trim element according to claim 10, wherein the graphic, the image, the pattern, the structure or the combination thereof is in multiple planes on at least one of the surface that faces away from the translucent carrier component and the surface that faces the translucent carrier component in order to produce a 3D or Moiré effect.

13. The interior trim element according to claim 1, further comprising a carrier wherein the translucent carrier component comprises a portion of the carrier, or wherein the translucent carrier component comprises an insert fitable into a cutout of the carrier.

14. The interior trim element according to claim 1, wherein the material of the translucent cover comprises at least one of a TPO, a TPU, a TPE, a PO or a PVC.

15. The interior trim element according to claim 14, wherein the translucent cover is provided with a foam layer or a spacer fabric on a rear side that faces the translucent carrier component.

16. The interior trim element according to claim 14, wherein the translucent cover includes a surface that faces away from the translucent carrier component which is provided with a protective layer.

17. The interior trim element according to claim 14, wherein the translucent cover is connected to the translucent carrier component by a translucent adhesive.

18. The interior trim element according to claim 17, wherein a fastening structure is molded or attached to the translucent cover.

19. The interior trim element according to claim 14 wherein the translucent cover is placed on the translucent carrier component in a form of a mat which comprises at least one of the TPO, the TPU, the TPE, the PO or the PVC.

20. The interior trim element according to claim 14 wherein the translucent cover is detachably connected to the translucent carrier component.

21. An interior trim element for a motor vehicle, comprising:
a translucent carrier component having a front side and a rear side, wherein the front side comprises a storage surface of a storage tray and/or a storage compartment to receive at least one object for storage,
a translucent cover on at least a portion of the storage surface of the front side of the carrier component,
a light source on the rear side of the carrier component, the light source operable to emit visible light which is directed to provide background lighting of the interior trim element,
wherein the translucent carrier component and translucent cover form a composite having a light transmittance (T) of visible light in a range between 1% and 20%,
wherein the translucent cover is visible to a passenger when the interior trim element is installed within the motor vehicle,
wherein, when visible light is provided from the light source, the interior trim element is arranged such that the visible light from the light source provides background lighting which illuminates at least a portion of the translucent cover, with the visible light passing through the composite from the translucent carrier component to the translucent cover,
wherein the translucent cover is formed of a material having a Shore A hardness in a range from 60 to 80;
wherein the light source comprises a background lighting device and an LED module, wherein the LED module provides the visible light to the background lighting device, which transmits the visible light as the background lighting which illuminates the translucent cover; and
wherein the background lighting device and the translucent carrier component are distinct components arranged such that the translucent carrier component is disposed between the translucent cover and the background lighting device.

22. The interior trim element according to claim 21 wherein the LED module provides the visible light to the background lighting device at a peripheral edge of the background lighting device.

* * * * *